Aug. 6, 1935.    R. M. RIBLET    2,010,108
ROLLER BEARING
Filed March 31, 1934
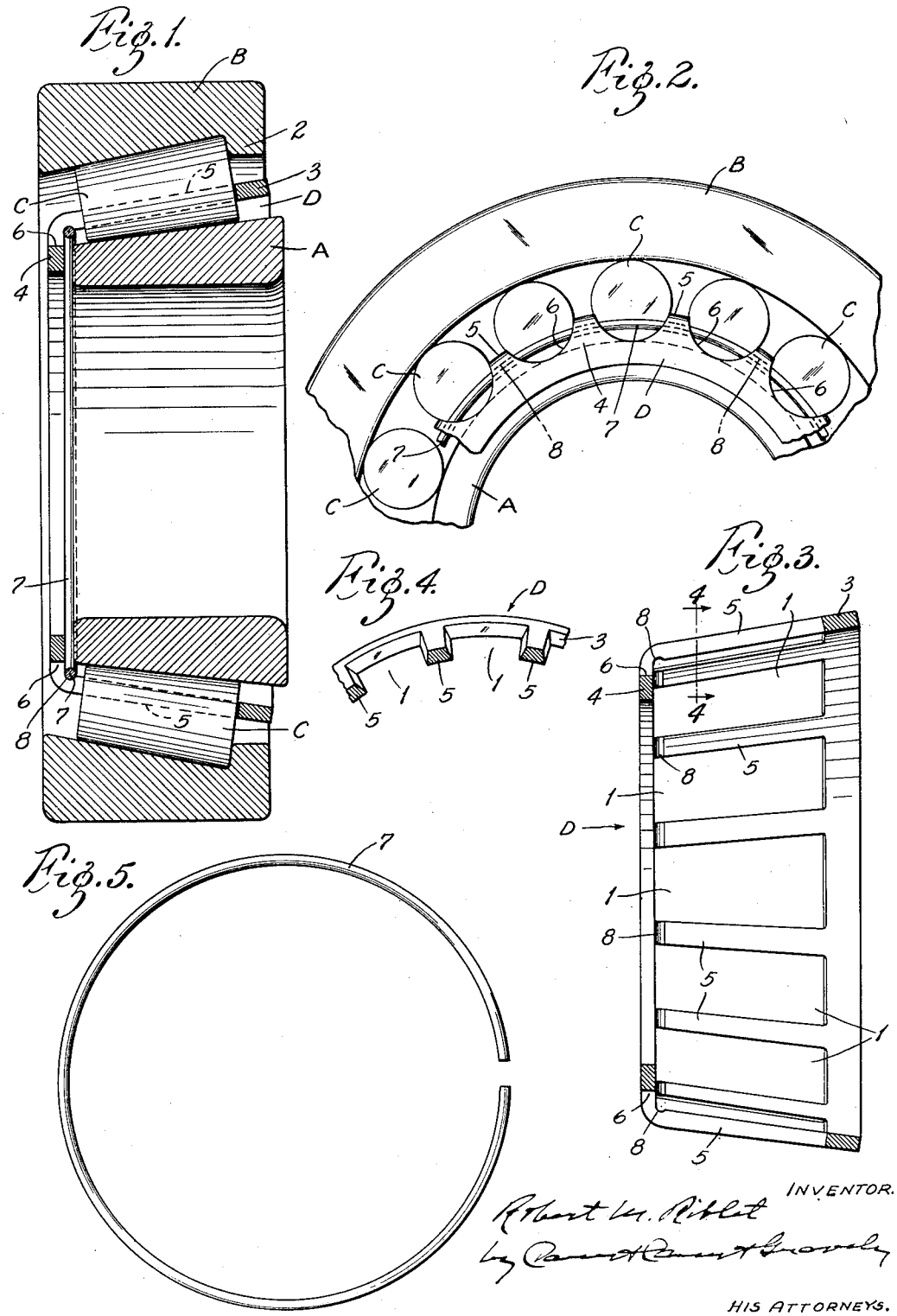

Patented Aug. 6, 1935

2,010,108

UNITED STATES PATENT OFFICE 2,010,108

ROLLER BEARING

Robert M. Riblet, Canton, Ohio, assignor to The Timken Roller Bearing Company, Canton, Ohio, a corporation of Ohio Application March 31, 1934, Serial No. 718,389

6 Claims. (Cl. 308—218)

This invention relates to roller bearings, particularly taper roller bearings of the type wherein the roller receiving pockets of the cage extend through the ends thereof so as to permit endwise separation of the cage and the rollers. This type of bearing is used to a considerable extent for heavy duty where inspection is important.

The principal object of the present invention is a cage and roller assembly of the above type adapted to form a self-contained assembly with a ribbed cup, thereby making the roller bearing easy to assemble, inspect and repair. The invention consists in the roller bearing and in the parts, combinations and arrangements of parts hereinafter described and claimed.

In the accompanying drawing, which forms part of this specification and wherein like symbols refer to like parts wherever they occur, Fig. 1 is a longitudinal sectional view of a taper roller bearing embodying my invention, Fig. 2 is an enlarged fragmentary end view illustrating the mounting of the retaining ring in the small end of the cage, Fig. 3 is a longitudinal sectional view of the cage, Fig. 4 is a fragmentary transverse section on the line 4—4 in Fig. 3; and Fig. 5 is a detail view of the retaining ring.

Referring to the accompanying drawing, my device is shown in connection with a taper roller bearing comprising a cone or inner bearing member A with a tapered outer surface constituting a raceway, a cup or outer bearing member B, with a tapered inner surface constituting a raceway, tapered bearing rollers C interposed between the respective raceways, and a spacing cage D provided with pockets I for the respective rollers. The cup B is provided with a rib 2 at the large end of its raceway for receiving the thrust of the large ends of the rollers C.

The cage D is preferably made of a single piece of metal with its large end in the form of a continuous ring 3. The small end of the cage is also a continuous ring or flange 4 that overlaps the small end of the cone A. These rings are connected by bridges 5 that are spaced apart to form the pockets I for the respective rollers. The pockets I in the cage are of less width than the rollers C and the cage is disposed radially inwardly with respect to the axes of the rollers, whereby the rollers are held against radial outward displacement by the cup B and against radial inward displacement by the cage when the cone A is removed. Said pockets are extended through the ring 4 at the small end of the cage in the form of arcuate concave notches 6 that extend radially inwardly of the innermost portions of the respective rollers so as to permit endwise separation of said cage and rollers.

The small end of the cage is provided with means for retaining the cup, cage and rollers in assembled relation when the cup is withdrawn endwise from the cone. Said retaining means preferably comprises a split wire ring 7 seated in an interrupted annular groove 8 provided therefor in the inner surface of the small end of the cage opposite the small ends of the rollers; that is, the ring is of larger diameter than the small end of the bearing cone and the annular groove in which it is seated is interrupted by the pockets in the cage.

The hereinbefore described roller bearing is of simple, strong and economical construction and easy to assemble and disassemble. In assembling the bearing, the rollers C are first placed in proper position within the ribbed cup B, the cage D is inserted in the large end of said cup with its bridges 5 interposed between adjacent rollers, and the retaining ring 7 is then sprung into the groove 8 in the small end of said cage. With the parts thus assembled, the cup, cage and rollers form a self-contained assembly adapted to be mounted on and dismounted from the cone as a unit. When it is desired to remove the rollers after their removal with the cup and cage as a unit, it is only necessary to remove the retaining ring, whereupon the cage may be removed longitudinally from the large end of the cup, thereby releasing all the rollers.

The invention is especially adapted for use with expensive heavy duty bearings that require frequent and thorough inspection. By the arrangement above described, it is very quick and easy to make such inspection, make the necessary replacements and reassemble the parts.

What I claim is:

1. A conical spacing cage for bearing rollers comprising a continuous integral ring at its large end, a continuous radially disposed ring at its small end and bridge members extending from said large ring to the outer edge portion of said small ring and defining pockets for the respective rollers, said small ring having notches in its outer edge portion in continuation of said pockets and extending radially inwardly of said bridges, and retaining means detachably mounted inside of said cage between the ring at the small end thereof and the adjacent ends of the rollers.

2. A conical spacing cage for tapered bearing rollers comprising a continuous integral ring at its large end, a continuous radially disposed ring at its small end and bridge members extending from said large ring to the outer edge portion of said small ring and defining pockets for the respective rollers, said small ring having notches in its outer edge portion in continuation of said pockets and extending radially inwardly of said bridges, said cage having an interrupted annular groove formed in the inside surfaces of said bridges alongside of the inner face of said small ring, and a retaining ring detachably mounted in said groove and extending across the notches in the outer edge portion thereof.

3. A tapered roller bearing comprising conical inner and outer raceway members, rollers between said members, and a conical spacing cage provided with pockets in which said rollers are mounted, said pockets extending entirely through the small end of said cage, said outer raceway member having a thrust rib at its large end only and said bearing cage having a portion at its small end overlapping the small end of said inner raceway member, said conical inner raceway member being without thrust ribs at either end.

4. A tapered roller bearing comprising a conical inner raceway member and a ribless outer raceway member, rollers between said members, a conical spacing cage provided with pockets in which said rollers are mounted, said pockets extending entirely through the small end of said cage, said outer raceway member having a thrust rib at its large end only and said bearing cage having a flanged portion at its small end overlapping the small end of said inner raceway member, and means detachably mounted inside the small end of said cage between the flanged portion thereof and the adjacent ends of said rollers.

5. A tapered roller bearing comprising conical inner and outer raceway members, tapered rollers interposed between the respective raceway members, and a conical spacing cage provided with pockets in which the rollers are mounted, said pockets extending entirely through the small end of said cage and being of less width than the rollers and said cage being disposed radially inwardly with respect to the axes of the rollers, said outer raceway member having a thrust rib at its large end and said bearing cage having a portion at its small end overlapping the small end of said inner raceway member, and means detachably mounted in the small end of said cage and extending across the adjacent ends of said rollers.

6. A tapered roller bearing comprising conical inner and outer raceway members, tapered rollers interposed between said members, and a conical spacing cage provided with pockets in which said rollers are mounted, said pockets extending entirely through the small end of said cage, said outer raceway member having a thrust rib at its large end and said bearing cage having a flanged portion at its small end overlapping the small end of said inner raceway member, and a retaining ring detachably mounted in the small end of said cage between said flanged portion and the small ends of said rollers.

ROBERT M. RIBLET.